Dec. 26, 1972  E. H. McDONALD ET AL  3,707,456
ELECTROCHEMICAL CELL
Filed Oct. 16, 1970

INVENTORS.
EDWARD H. McDONALD &
WILLIAM R. BANKS
BY Jack N. Shears
ATTORNEY 3,707,456
ELECTROCHEMICAL CELL
Edward H. McDonald and William P. Banks, Ponca City, Okla., assignors to Continental Oil Company, Ponca City, Okla.
Filed Oct. 16, 1970, Ser. No. 81,318
Int. Cl. B01k *3/00, 3/10*
U.S. Cl. 204—237                         18 Claims

ABSTRACT OF THE DISCLOSURE

An electrochemical cell for use in preparing tetraethyl lead, and including an anode, a lead cathode spaced from the anode, a semi-permeable, ion-exchange membrane between the cathode and anode, and a permeable shield interposed between the anode and the ion-exchange membrane to retard the diffusion of bromine to the membrane and thereby reduce attack of bromine on the membrane. The shield may be constructed of a material which is reactive with bromine to further and more completely block the passage of bromine into the catholyte. Bromine is preferably further removed from the anolyte solution by either sweeping the solution with a gas reactive with bromine or by removing the anolyte solution from the anode chamber of the cell, chemically removing the bromine and then recirculating the bromine-free anolyte to the cell.

BACKGROUND OF THE INVENTION

Field of the invention

This invention relates to electrochemical cells, and more particularly, to electrochemical cells having special utility in the electrochemical production of tetraethyl lead.

Brief description of the prior art

A new method which has recently been proposed for the production of tetraethyl lead, used extensively as a gasoline additive, employs an electrochemical process in which lead is alkylated with ethyl bromide at the cathode of an electrochemical cell. The cell is divided into a cathode compartment and an anode compartment by a special semipermeable, organic membrane. A lead cathode is provided in the cathode compartment, and the catholyte employed therein is a solution of ethyl bromide, water, acetone and tetrabutyl phosphonium bromide. A suitable anode, typically graphite, is provided in the anode compartment, and the anolyte solution employed therein is an electrically conductive salt solution, such as a sodium bromide or ammonium bromide solution. The semipermeable membrane employed is an ion-exchange membrane which is permeable to the passage of the bromide ions from the cathode compartment to the anode compartment so that the bromide ions may be converted to free bromine at the anode.

A major problem which has been encountered in the commercial preparation of tetraethyl lead by the described electrochemical method is the attack of the special semi-permeable organic membrane by free bromine which is continuously liberated at the anode in the course of the process. The bromine tends to migrate from the anode to the semi-permeable membrane as it becomes dissolved in the anolyte solution, and will soon destroy the semi-permeable organic membrane, or render it ineffective, unless some type of protective measures are taken to prevent such attack of the membrane.

BRIEF DESCRIPTION OF THE PRESENT INVENTION

The present invention provides an improved electrochemical cell useful for the commercial preparation of tetraethyl lead. The improved aspect of the cell resides primarily in a cell construction which prevents, or substantially reduces, attack of the semi-permeable organic membrane, utilized to separate the cathode and anode compartments of the cell, by bromine generated at the anode.

Broadly described, the electrochemical cell of this invention comprises a housing containing a semi-permeable, organic membrane which is permeable to bromide ions and is positioned within the cell to divide the housing into an anode compartment and a cathode compartment. The cell further contains an anode which is preferably constructed of a porous material, such as porous graphite or carbon. Most preferably, the anode consists of a bed of conducting particles, such as graphite or charcoal, which are retained in the desired geometric configuration of the bed by any suitable type of supporting framework.

Spaced from the anode, and located in the cathode compartment, is a lead cathode. A permeable or porous shield is disposed between the anode and the semi-permeable organic membrane, and functions to retard the diffusion of bromine from the anode into the anolyte solution during the electrochemical process. The porous shield which protects the membrane from diffusion of bromine through the anolyte solution is preferably constructed of a material which is reactive with bromine, and thus further and more completely blocks the passage of bromine into the anolyte solution adjacent the membrane. As an alternative to the manufacture of the porous shield of a material which is reactive with bromine, a separate permeable shield or member can be utilized in addition to the porous shield constructed of a nonreactive material, with the additional shield being made of paper, cotton or other material which is readily attacked by bromine, and not dissolved by the anolyte solution.

As a further measure for removing bromine from the anolyte solution before an opportunity is afforded for an attack of the ion-exchange, semi-permeable organic membrane, a gas, such as ethylene, which is readily reactive with the bromine, may be bubbled through the anolyte in close proximity to the anode to scrub bromine from the anolyte solution. Alternatively, the anolyte solution may be removed from the cell at a location adjacent the anode, and passed to a reactor in which traces of bromine are removed from the anolyte solution by a suitable stripping procedure. The last traces of bromine in the anolyte solution are then removed by treating it with a suitable chemical which is reactive with the bromine, such as ammonium carbonate, to yield an insoluble reaction product. The bromine-free anolyte solution is then recirculated to the anode compartment of the electrochemical cell.

From the foregoing description of the invention, it will be perceived that an important object of the invention is to provide an improved electrochemical cell which can be effectively employed in the process of electrochemically producing tetraethyl lead.

A more specific object of the invention is to provide an electrochemical cell for use in the electrochemical production of tetraethyl lead, which cell is characterized in having a relatively long, effective life of the semi-permeable, ion-exchange, organic membrane utilized to separate the anode and cathode compartments of the cell.

A further object of the invention is to provide means for preventing the attack of free bromine on the semi-permeable, ion-exchange, organic membrane utilized for separating the anode and cathode compartment in an electrochemical cell used in the production of tetraethyl lead.

An additional object of the invention is to provide a method for preventing or reducing the contact of free bromine with the barrier membrane in an electrochemical cell for producing tetraethyl lead.

Additional objects and advantages of the invention will become apparent as the following detailed description of the invention is considered in conjunction with the accompanying drawing.

DETAILED DESCRIPTION OF PREFERRED EMBODIMENTS OF THE INVENTION

Figure 1:
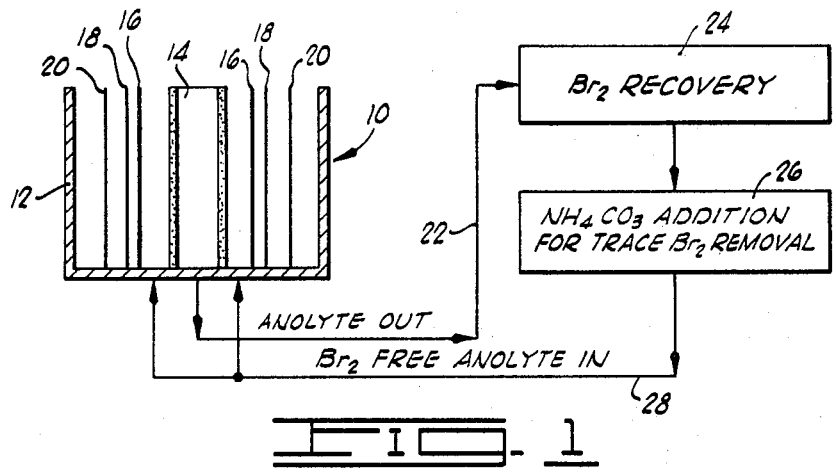
FIG. 1 of the drawing is a schematic illustration of an electrochemical cell constructed in accordance with one embodiment of the invention.

In the electrochemical production of tetraethyl lead, an electrochemical cell is utilized which includes an anode compartment and a cathode compartment separated from each other by a semi-permeable, ion-exchange, organic membrane which is permeable to bromide ions. A lead cathode is provided in the cathode compartment, and a suitable conductive anode is provided in the anode compartment. The catholyte solution utilized is a solution of ethyl bromide, water, acetone and tetrabutyl phosphonium bromide or tetrabutyl ammonium bromide. A suitable aqueous salt solution is utilized as the anolyte, and these include, for example, aqueous solutions of sodium bromide, ammonium bromide, or tetrabutyl ammonium bromide. In the course of the reaction, electrical current flows from the cathode to the anode by the passage of bromide ion from the catholyte and cations from the anolyte across the semi-permeable organic membrane. At the anode of the cell, free bromide is liberated. At the lead cathode, the lead is alkylated with ethyl groups derived from the ethyl bromide in the catholyte solution to yield the desired tetraethyl lead.

Experience with the process of electrochemically producing tetraethyl lead in the manner described has shown that after a period of time, the efficiency of the cell decreases, and the economic feasibility of preparing the tetraethyl lead by the described process decreases. In a series of experiments which we have conducted, we have determined that a primary cause for the decrease in the efficiency of the described process is the deterioration of the semi-permeable, organic, ion-exchange membrane utilized to separate the cathode compartment from the anode compartment as a result of the attack of this membrane by bromine formed at the anode in the course of the electrochemical process.

In one set of experiments which were conducted, a fresh semi-permeable organic membrane was used as a partitioning member between the arms of a U-shaped glass cell. A typical catholyte solution including ethyl bromide, distilled water, acetone and tetrabutyl phosphonium bromide was placed in one arm. In the other arm (simulating the anode compartment) of the U-shaped glass cell, distilled water was located. The cell, and catholyte and anolyte solutions contained therein, were maintained at a temperature of 75° F., and the solutions in the arms were stirred continuously for a period of 14 days. No electrical current was passed during this time. Samples were removed from each of the cell compartments periodically for composition analyses.

In order to compare the effect of exposing the semi-permeable organic membrane to bromine, a membrane identical to that used in the described series of plain membrane runs was exposed to an aqueous solution containing 5 weight percent ammonium bromide and 3 weight percent bromine for a period of five days. This brominated membrane was then positioned in the U-shaped glass cell in the identical manner described above, and distilled water was placed in the one arm, and the described catholyte solution was placed in the other arm. Again the temperature was maintained at 75° F., and the solutions in each compartment were stirred continuously for a period of 14 days, with samples removed periodically for composition analyses.

A comparision of the results obtained using the non-brominated and brominated semi-permeable organic membranes in the two series of tests indicated that acetone diffused through the membrane from the catholyte solution into the distilled water at a substantially greater rate in the case of the brominated membrane than in the case of the fresh, non-brominated membrane. In the case of the brominated membrane, the rate of diffusion of the acetone was approximately twice the rate of diffusion through the non-brominated membrane. This result suggested that the attack on the membrane by free bromine causes deterioration of the membrane so as to upset the rates of diffusion optimum for effectively carrying out the process of tetraethyl lead production. Any acetone passing through the membrane into the anolyte reacts with bromine, thereby wasting both bromine and acetone.

In further experiments conducted for the purpose of examining the effect of exposure of the semi-permeable organic membrane to bromine, the U-shaped glass cells were again used and divided by brominated and non-brominated membranes. After positioning the respective membranes in the U-shaped glass cells to form cathode and anode compartments, a catholyte solution which included ethyl bromide, water, acetone, and tetrabutyl phosphonium bromide was placed in the cathode compartments, and an anolyte solution which was an aqueous solution of ammonium bromide was placed in the anode compartments. Maintaining the temperature at 75° F., the solutions were stirred continuously while they were electrolyzed for a two-hour period at 490 ma. using platinum electrodes. The compositions of the anolyte and catholyte solutions were then analyzed, and from these analyses the membrane transference numbers were calculated.

The results of these tests showed that for the plain, non-brominated membrane, the fraction of current carried by the bromide ion was 0.73, and the fraction carried by the ammonium ion was 0.27. For the bromine-exposed membrane, the fraction of current carried by the bromide ion was 0.60, and the fraction carried by the ammonium ion was 0.40. The results thus indicated that exposure of the semi-permeable organic membrane to a high bromine concentration increases the permeability of the membrane to ammonium ion, and therefore increases the amount of ammonium ion consumed in the operation of the tetraethyl lead process. Since the ammonium ion interferes with the production of tetraethyl lead at the cathode, the efficiency of the process is decreased as the semi-permeable organic membrane is exposed to high concentrations of bromine.

For the purpose of reducing the attack of the semi-permeable membrane by bromine, the cell construction of the present invention was evolved. Three types of cell construction in accordance with the invention are shown in the drawing.

Referring to FIG. 1 of the drawings, shown therein is an electrochemical cell 10 which includes a cell housing 12 which is shown schematically as it appears in section. The housing 12 thus includes side walls and a bottom wall, and can be either open or closed at the top. The housing 12 may be in the configuration of a cylinder, a parallelepiped, or any other suitable configuration adapted to contain the liquid electrolyte solutions used in the cell.

The embodiment of the electrochemical cell 10 depicted in FIG. 1 has located at the center thereof, an anode 14 which may be constructed of any suitable electrically conductive material, but which is preferably in cylindrical shape of a porous material, such as porous graphite or the like. The porosity of the anode aids in preventing the ready diffusion of bromine therefrom into the surrounding anolyte solution in a manner hereinafter described.

Surrounding the porous cylindrical anode 14 is a porous cylindrical shield 16 which is spaced radially outwardly from, and concentrically around, the anode. The porous shield 16 acts as a screen through which the bromine dissolved in the anolyte solution must pass in order to reach a semi-permeable, ion-exchange organic membrane 18, and the shield thus functions to retard migration of the bromine from the anode toward the ion-exchange membrane. The shield 16 may be of any suitable material having sufficient rigidity to maintain its geometrical configuration, and which is not attacked by the anolyte solution.

Concentrically surrounding the porous shield 16 and disposed between this shield and a lead cathode 20, hereinafter described, is the semi-permeable, ion-exchange organic membrane 18 which divides the interior of the housing 12 into an anode compartment and a cathode compartment. The semi-permeable organic membrane 18 thus acts as a barrier separating the anolyte and catholyte solution from each other, and for the purpose of production of tetraethyl lead, is a material which is permeable to bromide ions and, to a lesser degree, to ammonium ions and other cations. Suitable materials for the construction of the semi-permeable, ion-exchange membrane 18 are well known in the art, and are used in electrochemical cells previously employed in tetraethyl lead processes. A typical material is a polymeric, high molecular weight highly cross-linked material sold under the trade name IONIC-111-EZG-067 by Ionics, Incorporated of Watertown, Mass. Disposed radially outwardly from the ion-exchange membrane 18 is the lead cathode 20. The lead cathode in the embodiment illustrated in FIG. 1 is of standard construction in tetraethyl lead electrochemical cells, and is positioned on the opposite side of the ion-exchange membrane 18 from the porous shield 16.

A catholyte solution, which typically contains ethyl bromide, water, acetone and tetrabutyl phosphonium bromide, is placed in the cathode compartment which is that volume within the housing 12 lying radially outwardly from the ion-exchange membrane 18 and containing the lead cathode 20. An anolyte solution, which typically may be an aqueous solution of water-soluble, electrically conductive organic and inorganic bromide salts, such as sodium bromide, ammonium bromide, tetrabutyl phosphonium bromide, is disposed in the anode compartment which surrounds the anode 14 and lies radially inwardly of the membrane 18.

For the purpose of effecting a more complete removal of bromine from the anolyte solution which contacts the semi-permeable, ion-exchange organic membrane 18, a conduit 22 is provided which communicates with the interior of the housing 12 at a point within the cylindrical anode 14, and is adapted to receive anolyte solution from this point within the cell. The anolyte solution is passed through the conduit 22 to a bromine recovery zone 24 where bromine is stripped out of the anolyte solution by any suitable means. Residual bromine which may not be removed by the stripping process is then removed by treating the anolyte solution in a treating zone 26 with a bromine-reactive material, such as ammonium carbonate. The residual bromine remaining in the anolyte solution reacts with the ammonium carbonate, or other treating material, to form an insoluble precipitate which can be filtered, or removed by other suitable means, from the anolyte solution. The bromine-free anolyte solution is then recirculated to the electrochemical cell 10 through a conduit 28. The conduit 28 is connected by branches to the cell 10 at a point radially outwardly from the anode 14, and thus functions to deliver the bromine-free anolyte to a position which is relatively near to the shield 16 and the ion-exchange membrane 18.

When the electrochemical cell and bromine removal system depicted in FIG. 1 is utilized for the electrochemical production of tetraethyl lead, bromine attack of the sensitive semi-permeable, ion-exchange membrane is substantially reduced and the life of this membrane is thus greatly extended. The membrane-protective features which characterize the depicted system are several, and include the retardation of diffusion by the porous shield 16, which holds up and retards the passage of bromine toward the ion-exchange membrane in the anolyte solution. Even prior to the migration of any of the bromine toward the shield and the membrane disposed outwardly thereof, however, release of bromine from the porous anode has been retarded by the porous character of the anode, where a porous anode is employed, and the anolyte solution has been scrubbed to remove bromine therefrom prior to recycling it to the cell. The anolyte solution thus purified is reintroduced to the cell 10 in a position which is radially outwardly of the anode 14, and in relative close proximity to the shield 16 and to the ion-exchange membrane 18.

Figure 2:
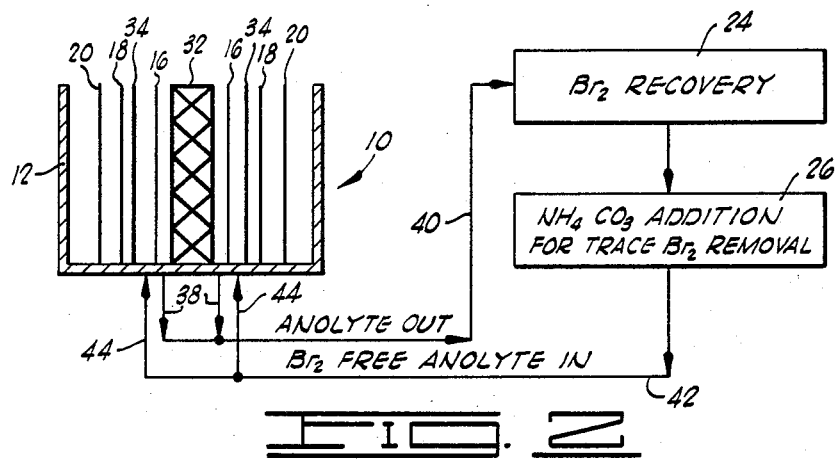
FIG. 2 is a schematic illustration of another embodiment of electrochemical cell constructed in accordance with the invention.

A different embodiment of the invention is illustrated in FIG. 2 of the drawings. Where structural elements identical to structural elements used in the FIG. 1 embodiment have been employed, identical reference numerals have been utilized. Thus, the electrochemical cell 10 again includes a housing 12 constructed identically to that shown in FIG. 1. Positioned within the housing 12, however, is an anode 32 differing in its construction from the anode 14 shown in FIG. 1. The anode 32 comprises a bed of electrically conductive particles which may, for example, be graphite or charcoal, said bed being retained in a porous supporting framework. The supporting framework may be a screen of relatively rigid material which is not reactive with the anolyte solution. The screen thus constitutes a supporting framework, and the mesh size of the screen and the particle size of the conducting particles contained therein are such that as the anode particulate material sloughs off due to the passage of electrical current through the anode, the destroyed material may be easily replaced by simply adding additional particulate material to the open upper end of the supporting framework. Moreover, the surface area of the particulate anode 32 is higher than with any other anode shape and this results in a lower anodic current density on the particles. Therefore, the electrochemical cell can be operated at a higher current throughput, and consequently at a higher product output, before the current density on the anode particles becomes prohibitively high and causes anode wear.

Disposed radially outwardly from the anode 32 and concentrically in relation thereto is a porous cylindrical shold 16 which may be constructed substantially identically to the shield 16 referred to in the discussion of the FIG. 1 embodiment. The shield 16 functions, as does the shield depicted in FIG. 1, to retard diffusion of bromine in the anolyte solution toward the semi-permeable, ion-exchange organic membrane of the cell.

Concentrically surrounding the porous shield 16 and spaced radially outwardly therefrom is a cylindrical permeable shield 34 which is constructed of a material which is reactive with, and readily attacked by bromine. It will be noted that the permeable, bromine-reactive shield 34 is positioned between the porous shield 16 and the semi-permeable, ion-exchange membrane 18. The permeable shield 34 may be thought of as a sacrificial shield which is subjected to attack by, and reaction with, bromine for the purpose of protecting the organic, semi-permeable membrane from attack by this material. The permeable, shield 34 can, for example, be made of paper, polyethylene or cotton, and other materials will be recognized by those skilled in the art as being susceptible to attack by bromine. The permeable, bromine-reactive shield 34 should further, of course, not be dissolved by, or be reactive with the anolyte solution. As in the case of the structure depicted in FIG. 1, the electrochemical cell 10 of FIG. 2 is provided with a cylindrical lead cathode 20 which is positioned radially outwardly of the semi-permeable, ion-exchange membrane 18.

With the cell constructed in the manner described, a slightly different construction is necessary in the portion of the system which provides for the removal of anolyte solution from the cell, and recirculation of this solution to the cell after bromine has been removed therefrom. Thus, a plurality of conduits 38 remove anolyte solution from points closely adjacent the outer periphery of the anode 32, and convey the anolyte solution thus removed to a conduit 40 by which the anolyte is then conveyed to the scrubbing zone 24 heretofore described. From the scrubbing zone 24, the anolyte solution from which a substantial portion of the bromine has been removed is conveyed to the treating zone 26 where residual bromine is removed. The bromine-free anolyte solution is then recycled to the cell 10 through a conduit 42 and enters the cell at a position outwardly of the porous shield 16 by way of a pair of branch conduits 44 which receive the anolyte solution from the conduit 42.

It is believed that a detailed discussion of the operation of the embodiment of the invention depicted in FIG. 2 is unnecessary in view of the similarities of its function and operation to the embodiment shown in FIG. 1 and previously described. It should be pointed out, however, that the electrochemical cell constructed in accordance with the present invention as depicted in FIG. 2 provides the further advantage with respect to that shown in FIG. 1 of incorporating the sacrificial permeable shield 34 in the cell so that any bromine which may have migrated in the anolyte solution through the porous shield 16 will attack and react with the sacrificial permeable shield 34 and be expended in this manner before having an opportunity to migrate to, and attack, the sensitive, ion-exchange membrane 18.

Figure 3:
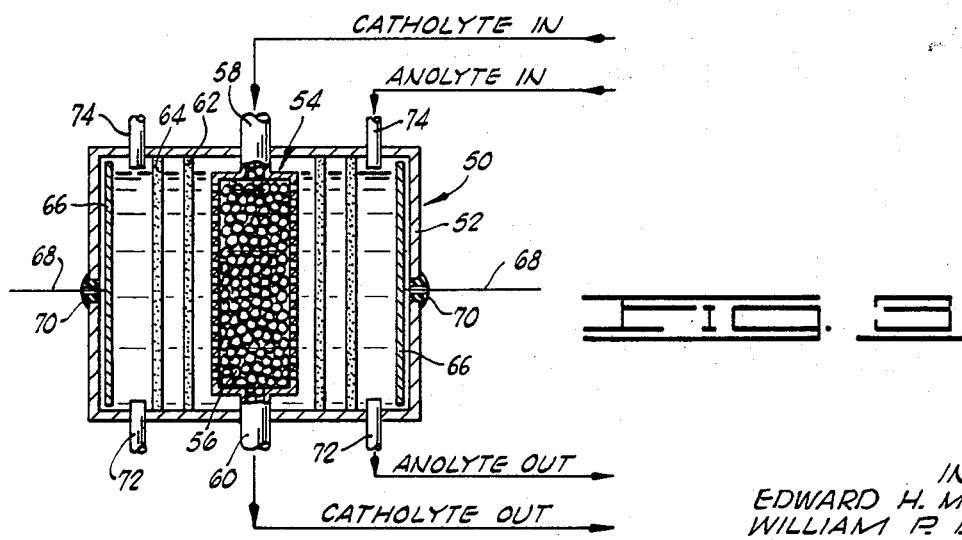
FIG. 3 is a sectional view of yet another embodiment of the invention.

Yet another embodiment of the invention is depicted in FIG. 3 of the drawings. The electrochemical cell is here designated generally by reference numeral 50, and includes a housing 52 which, in this instance, is closed at the top. Positioned centrally within the housing 52 is a cathode assembly designated generally by reference numeral 54. The cathode assembly 54 includes a cylindrical housing 56 made of screen or other permeable material which is not reactive with the catholyte solution. Open from the top and bottom of the cathode housing 56 through the cell housing 52 are a pair of conduits 58 and 60. Positioned within the housing 56 is a bed of lead shot, and as this shot is consumed in the electrochemical process of producing tetraethyl lead, the shot may be replaced within the housing 56 by adding shot through the conduit 58. Also, the conduit 58 enables a constant supply of catholyte solution to be supplied to the interior of the cathode housing 56. The desired tetraethyl lead product and some of the catholyte can be removed from the housing 56 through the conduit 60.

Positioned concentrically around the cathode assembly 54 within the housing 52 of the cell 50 is an annular semi-permeable, ion-exchange organic membrane 62. The membrane 62 divides the interior of the housing 52 of the cell 50 into a cathode compartment containing cathode assembly 54, and an anode compartment lying radially outwardly of the membrane. Positioned within the anode compartment is a screen 64 formed of a bromine-reactive material as hereinbefore described. The screen 64 is permeable and may be constructed of paper, cotton or other bromine reactive material. The screen 64 may also suitably be constructed of polyethylene which will effectively absorb and retain bromine. Concentrically surrounding the permeable screen 64 of bromine-reactive material is an annular anode 66 constructed of graphite or other suitable material, and preferably porous in nature as hereinbefore described. The annular anode 66 is spaced inwardly from the walls of the housing 52 and is connected to suitable electrical leads 68 which extend outwardly through suitable seals 70 in the housing and are adapted for connection in the electrical circuit of the cell.

For the purpose of removing anolyte solution from the cell 50 for scrubbing bromine therefrom, and treating the anolyte to remove residual bromine in the manner heretofore described, a plurality of conduits 72 communicate with the interior of the housing 52 adjacent the radially inner side of the anode 66. The conduits 72 function to remove the anolyte solution from the anode chamber and convey it to the scrubbing and treating zones as hereinbefore described. Conduits 74, which communicate with the interior of the housing 52 adjacent the top of the anode 66, are utilized for recycling the bromine-free anolyte solution to the anode compartment.

In the operation of the embodiment of the invention depicted in FIG. 3, the electrical current is passed from the cathode to the anode by means of bromide ions which can pass through the semi-permeable organic membrane 62. The ethyl bromide in the catholyte solution reacts with the lead shot contained within the cathode assembly 54 to form the desired tetraethyl lead product. As the lead shot are expended in the process, additional shot are added through the conduit 58 to the interior of the cathode housing 56 forming a part of the cathode assembly 54. Concurrently, catholyte solution is replenished in the cathode compartment by adding catholyte through the conduit 58, and removing catholyte and tetraethyl lead product through the conduit 60.

Attack of the semi-permeable organic membrane 62 by bromine liberated at the anode 66 is prevented by the permeable screen 64 of bromine-reactive material interposed between the anode and the semi-permeable membrane 62. Moreover, continuous removal of the anolyte solution for purposes of bromine removal, followed by recycling of the bromine-free anolyte solution to the anode compartment, aids greatly in the reduction of the bromine present in the anolyte solution. The use of the anolyte recirculation system described thus further extends the period of time over which the permeable screen of bromine-reactive material may be utilized without replacement in the cell.

From the foregoing description in the invention it will be apparent that the present invention provides an improved electrochemical cell in which the process of producing tetraethyl lead may be carried out efficiently. The semi-permeable organic membrane utilized to separate the cathode compartment from the anode compartment in such cell has a relatively longer useful service life than such membranes used in cells as previously used.

Although several preferred embodiments of the invention have been herein described in order to illustrate and exemplify the basic principles of the invention, it will be readily perceived that variations in cell geometry and configuration which differ markedly from the configuration shown and described herein can be employed without departure from, or relinquishment of, the basic principles underlying the invention. Changes and modifications of this type are therefore deemed to be circumscribed by the spirit and scope of the invention, except as the same may be necessarily limited by the appended claims or reasonable equivalents thereof.

What is claimed is:

1. An electrochemical cell assembly for the production of tetraethyl lead comprising:
   a cell housing;
   a semi-permeable organic membrane permeable to bromide ions partitioning said housing into an anode compartment and a cathode compartment;
   a lead cathode in said cathode compartment;
   an anode in said anode compartment; and
   a porous shield means disposed between the anode and semi-permeable membrane to substantially retard the diffusion of bromine from the anode.

2. An electrochemical cell assembly of claim 1 wherein said porous shield means is selected from:

(a) a porous shield constructed of material non-reactive with bromine,
(b) a permeable member including material reactive with bromine, or
(c) a combination of (a) and (b).

3. An electrochemical cell assembly of claim 2 wherein said porous shield means for substantially retarding bromine migration includes a bromine reactor device for contacting an anolyte solution disposed in said anode compartment.

4. An electrochemical cell assembly as defined in claim 1 wherein said bromine migration reducing means is further characterized as comprising a permeable structure positioned in said anode compartment between said anode and said membrane for retarding the rate at which bromine diffuses from said anode to said membrane.

5. An electrochemical cell assembly as defined in claim 1 wherein said anode is porous.

6. An electrochemical cell assembly as defined in claim 1 wherein said anode comprises a bed of particles of electrically conducting material.

7. An electrochemical cell assembly as defined in claim 1 wherein said lead cathode comprises
a bed of lead particles; and
means for replacing lead particles in said bed as the lead particles therein are expended in the formation of tetraethyl lead.

8. An electrochemical cell assembly as defined in claim 1 and further characterized as including
means for removing an anolyte solution from the anode compartment of said cell housing and then recycling said anolyte solution to said anode compartment; and
bromine removal means in said anolyte solution removing and recycling means and located external of said cell housing for freeing externally circulated anolyte solution from bromine.

9. An electrochemical cell as defined in claim 3 wherein said bromine reactor device comprises means for passing a bromine reactive gas through said anolyte solution.

10. An electrochemical cell as defined in claim 3 wherein said bromine reactor device comprises means for contacting said anolyte solution with a material forming an anolyte-insoluble reaction product with bromine.

11. An electrochemical cell assembly as defined in claim 3 wherein said bromine reactor device comprises a permeable shield of a material reactive with bromine positioned in said anode compartment between said anode and said membrane.

12. An electrochemical cell assembly as defined in claim 4 wherein said permeable structure is a material reactive with bromine.

13. An electrochemical cell assembly as defined in claim 4 and further characterized as including a shield of bromine-reactive material positioned in said anode compartment.

14. An electrochemical cell assembly as defined in claim 4 and further characterized as including
a first conduit for conveying anolyte solution from between said anode and said permeable structure to a location outside said cell housing;
means connected to said first conduit outside said cell housing for removing bromine from said anolyte solution; and
a second conduit connected to said bromine removing means and communicating with said anode compartment between said membrane and said permeable structure.

15. An electrochemical cell assembly as defined in claim 4 wherein said anode is porous.

16. An electrochemical cell assembly as defined in claim 7 and further characterized as including means for continuously removing tetraethyl lead from said cathode compartment.

17. An electrochemical cell assembly as defined in claim 8 wherein said bromine removal means comprises means for bubbling a gas reactive with bromine through said anolyte solution.

18. An electrochemical cell assembly as defined in claim 11 and further characterized as including
scrubbing means at a location outside said cell housing for contacting anolyte solution with a bromine-reactive gas; and
conduit means for conveying anolyte solution from said anode compartment to said scrubbing means, and recycling scrubbed anolyte solution from said scrubbing means to said anode compartment.

References Cited

UNITED STATES PATENTS

| | | | |
|---|---|---|---|
| 2,741,589 | 4/1956 | Kunin | 204—252 X |
| 3,135,673 | 6/1964 | Tirrell et al. | 204—180 P |
| 3,069,334 | 12/1962 | Ziegler et al. | 204—59 |
| 3,392,093 | 7/1968 | Smeltz | 204—59 X |
| 3,573,178 | 3/1971 | Blackmar | 204—272 |
| 3,574,084 | 4/1971 | Bruce | 204—263 |

JOHN H. MACK, Primary Examiner

D. R. VALENTINE, Assistant Examiner

U.S. Cl. X.R.

204—263, 265, 266, 275, 283, 301